US009886273B1

(12) United States Patent
Eldar et al.

(10) Patent No.: US 9,886,273 B1
(45) Date of Patent: Feb. 6, 2018

(54) MAINTAINING PACKET ORDER IN A PARALLEL PROCESSING NETWORK DEVICE

(71) Applicant: Marvell Israel (M.I.S.L) Ltd., Yokneam (IL)

(72) Inventors: Alon Eldar, Ra'anana (IL); Eliya Babitsky, Ceasaria (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 224 days.

(21) Appl. No.: 14/838,336

(22) Filed: Aug. 27, 2015

Related U.S. Application Data (60) Provisional application No. 62/043,392, filed on Aug. 28, 2014.

(51) Int. Cl.
*H04L 12/56* (2006.01)
*G06F 9/30* (2006.01)

(52) U.S. Cl.
CPC ........ *G06F 9/3005* (2013.01); *G06F 9/30145* (2013.01)

(58) Field of Classification Search
CPC .................................................. G06F 9/30145
USPC ........................................................ 370/412
See application file for complete search history.

(56) References Cited

U.S. PATENT DOCUMENTS

| 5,764,895 | A | 6/1998 | Chung |
| 5,793,747 | A * | 8/1998 | Kline ................. H04L 12/5602 |
| | | | 370/230 |
| 6,892,285 | B1 * | 5/2005 | Key ........................ H04L 29/06 |
| | | | 370/392 |
| 7,685,250 | B2 * | 3/2010 | Connor .................... H04L 47/10 |
| | | | 709/214 |
| 7,765,328 | B2 | 7/2010 | Bryers et al. |
| 7,864,764 | B1 | 1/2011 | Ma et al. |
| 7,924,860 | B1 | 4/2011 | Frailong et al. |
| 8,111,690 | B2 | 2/2012 | Hussain et al. |
| 8,310,927 | B1 | 11/2012 | Cohen |

(Continued)

FOREIGN PATENT DOCUMENTS

WO   WO-99/07180   2/1999

OTHER PUBLICATIONS

U.S. Appl. No. 14/610,834, Levy et al., "Packet Distribution with Prefetch in a Parallel Processing Network Device," filed Jan. 30, 2015.

(Continued)

*Primary Examiner* — Guang Li (57) ABSTRACT

An instruction execution processor has an input to receive instructions associated with maintaining a queue for storing packet identifiers (IDs) corresponding to packets being processed by a network device. A memory coupled to the instruction execution processor is for storing instructions received at the input of the instruction execution processor and not executed by the instruction execution processor. An instruction feedback processor is coupled to the instruction execution processor. The instruction feedback processor is configured to, in response to receiving an output from the instruction execution processor, identify one or more instructions, stored in the memory, that correspond to a new packet ID at the head of the queue, and feed back, to the input of the instruction execution processor, the one or more identified instructions.

18 Claims, 6 Drawing Sheets

(56) References Cited

U.S. PATENT DOCUMENTS

| | | | |
|---|---|---|---|
| 8,917,738 B2 | 12/2014 | Sundararaman et al. | |
| 9,148,384 B2* | 9/2015 | Sherlock | H04L 47/6215 |
| 9,276,868 B2 | 3/2016 | Shumsky et al. | |
| 9,455,907 B1 | 9/2016 | Shumsky et al. | |
| 9,461,939 B2 | 10/2016 | Wohlgemuth et al. | |
| 9,467,399 B2 | 10/2016 | Wohlgemuth et al. | |
| 9,479,620 B2 | 10/2016 | Levy et al. | |
| 9,553,820 B2 | 1/2017 | Shumsky et al. | |
| 9,571,380 B2 | 2/2017 | Kadosh et al. | |
| 2002/0114277 A1* | 8/2002 | Kyusojin | H04L 43/00 370/230.1 |
| 2006/0239194 A1 | 10/2006 | Chapell | |
| 2008/0114887 A1* | 5/2008 | Bryers | H04L 29/06 709/230 |
| 2009/0296580 A1* | 12/2009 | Williams, Jr. | H04L 47/34 370/235 |
| 2012/0002546 A1 | 1/2012 | Sundararaman et al. | |
| 2012/0177047 A1* | 7/2012 | Roitshtein | H04L 69/22 370/392 |
| 2013/0070584 A1* | 3/2013 | Hutchison | G06F 11/3058 370/216 |
| 2014/0029449 A1 | 1/2014 | Xu et al. | |
| 2014/0169378 A1 | 6/2014 | Shumsky et al. | |
| 2014/0177470 A1 | 6/2014 | Roitshtein et al. | |
| 2014/0192815 A1 | 7/2014 | Shumsky et al. | |
| 2015/0071079 A1 | 3/2015 | Kadosh et al. | |
| 2015/0110113 A1 | 4/2015 | Levy et al. | |
| 2015/0110114 A1 | 4/2015 | Wohlgemuth et al. | |
| 2015/0113190 A1 | 4/2015 | Wohlgemuth et al. | |
| 2015/0172187 A1 | 6/2015 | Levy et al. | |
| 2015/0172188 A1 | 6/2015 | Levy et al. | |
| 2016/0182392 A1 | 6/2016 | Shumsky et al. | |

OTHER PUBLICATIONS

Office Action in U.S. Appl. No. 15/056,646, dated Dec. 22, 2016 (12 pages).

Office Action in U.S. Appl. No. 14/109,479, dated May 22, 2015 (18 pages).

Notice of Allowance in U.S. Appl. No. 14/109,479, dated Oct. 26, 2015 (10 pages).

Office Action in U.S. Appl. No. 14/209,513, dated Feb. 9, 2016 (14 pages).

Notice of Allowance in U.S. Appl. No. 14/209,513, dated Sep. 14, 2016 (5 pages).

U.S. Appl. No. 14/092,521, Shumsky et al, "Multithreaded Parallel Packet Processing in Network Devices," filed Nov. 27, 2013 (27 pages).

Shpiner et al., "Reducing the Reordering Delay in Multi-Core Network Processors", Technical Report TR12-01, Com net, Technion, Israel, Jan. 2012, 12 pages.

\* cited by examiner

MAINTAINING PACKET ORDER IN A PARALLEL PROCESSING NETWORK DEVICE

CROSS-REFERENCE TO RELATED APPLICATION

This application claims the benefit of U.S. Provisional Patent Application No. 62/043,392, entitled "Reorder Unit," filed on Aug. 28, 2014, which is hereby incorporated by reference herein in its entirety.

This application is related to U.S. patent application Ser. No. 14/109,479, entitled "Maintaining Packet Order in a Parallel Processing Network Device," filed on Dec. 17, 2013, and to U.S. patent application Ser. No. 14/209,513, entitled "Maintaining Packet Order in a Parallel Processing Network Device," filed on Mar. 13, 2014, the disclosures of both of which are hereby incorporated by reference herein in their entireties.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like employ parallel packet processing of packet streams in which multiple packet processing elements simultaneously and in parallel perform processing of different packets. In such embodiments, it is important to efficiently utilize multiple processing elements to concurrently perform parallel processing of packets belonging to a data flow while efficiently maintaining an order of packets within the data flow.

SUMMARY

In an embodiment, a controller device comprises an instruction execution processor having an input to receive instructions associated with maintaining a queue for storing packet identifiers (IDs) corresponding to packets being processed by a network device, and a memory coupled to the instruction execution processor, the memory for storing instructions received at the input of the instruction execution processor and not executed by the instruction execution processor. The controller device also comprises an instruction feedback processor coupled to the instruction execution processor, the instruction feedback processor configured to, in response to receiving an output from the instruction execution processor, identify one or more instructions, stored in the memory, that correspond to a new packet ID at the head of the queue, and feed back, to the input of the instruction execution processor, the one or more identified instructions.

In another embodiment, a method comprises: receiving, at an input of an instruction execution processor, instructions to be performed by the instruction execution processor, the instructions associated with maintaining a plurality of queues of packet identifiers (IDs) corresponding to packets being processed by a network device; storing, in a memory, instructions received at the input of the instruction execution processor that are not executed by the instruction execution processor; generating, with the instruction execution processor, an output that indicates a new head of one of the queues; and in response to the output, identifying, at an instruction feedback processor, one or more instructions, stored in the memory, that correspond to a new packet ID at the head of the queue, and feeding back, with the instruction feedback processor, the one or more identified instructions to the input of the instruction execution processor.

DETAILED DESCRIPTION

Figure 1:
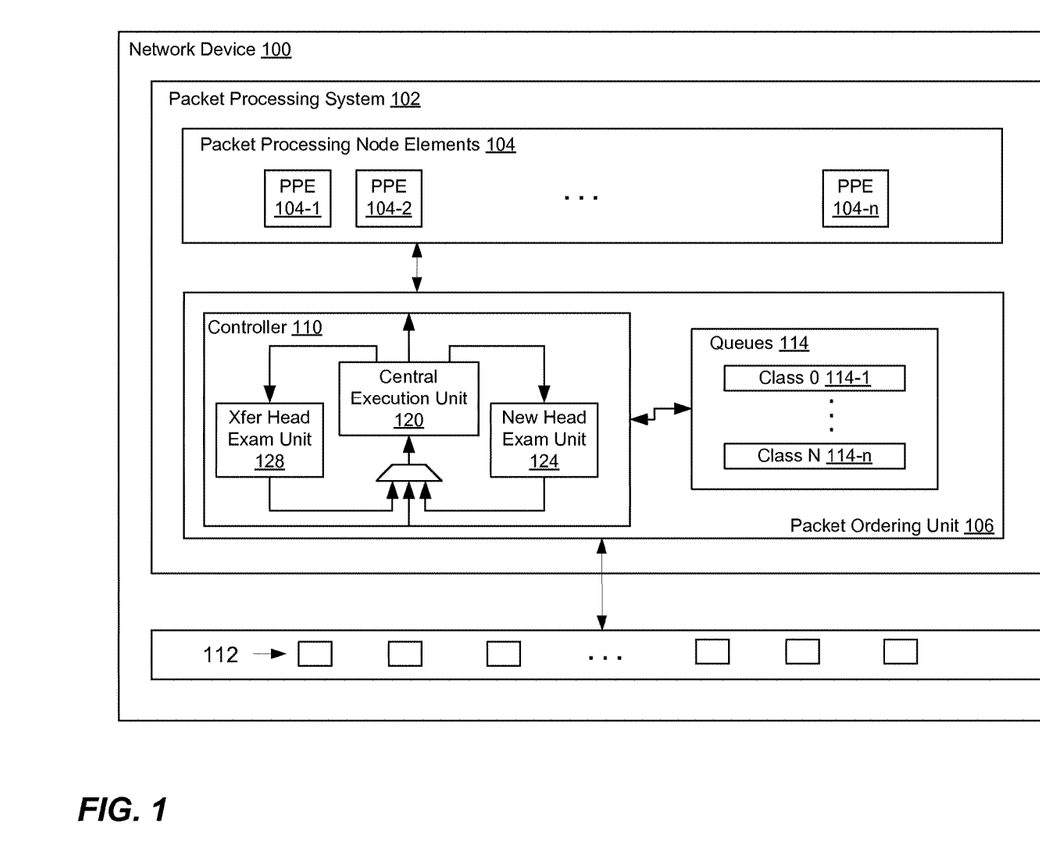
FIG. 1 is a block diagram of an example network device configured according to an embodiment of the present disclosure to efficiently process network packets using a plurality of packet processing elements while maintaining an order of at least some of the packets when transmitting the packets.

FIG. 1 is a block diagram of an example network device 100 configured to efficiently process network packets using a plurality of packet processing elements 104-1 to 104-*n* while maintaining an order packets in data flows processed by the network device 100, according to an embodiment. The network device 100 is generally a computer networking device that connects two or more computer systems, network segments, subnets, and so on. For example, the network device 100 is suitably a network access point, in one embodiment. It is noted, however, that the network device 100 is not necessarily limited to a particular protocol layer or to a particular networking technology (e.g., Ethernet). For instance, the network device 100 could also be a bridge, a router, a VPN concentrator, etc.

The network device 100 includes a packet processing system 102, sometimes referred to as packet processor 102 for simplicity, and the packet processor 102, in turn, includes a plurality of packet processing node elements (PPEs) 104 and a packet ordering processor 106 (sometimes referred to herein as "the packet ordering unit 106"). The network device 100 also includes a plurality of network ports 112 coupled to the packet processor 102, and each of the network ports 112 is coupled via a respective communication link to a communication network and/or to another suitable network device within a communication network. Generally speaking, the packet processor 102 is configured to process packets received via ingress ports 112, to determine respective egress ports 112 via which the packets are to be transmitted, and to forward the packets to the determined egress ports 112 for transmission. In some embodiments, the packet processor 102 is configured to process packet descriptors associated with the packets rather than to process the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet.

The packet ordering unit 106 includes a controller device 110 (sometimes referred to herein as "the controller 110") configured to distribute processing of packets received by the network device 100 via the ports 112 to the plurality of PPEs 104, and to maintain ordering of the packets. The PPEs 104 are configured to concurrently, in parallel, perform processing of respective packets, and each PPE 104 is generally configured to perform at least two different processing operations on the packets, in an embodiment. According to an embodiment, the PPEs 104 are configured to process packets using computer readable instructions stored in a non-transitory memory (not shown), and each PPE 104 is configured to perform all necessary processing (run to completion processing) of a packet.

In operation, the network device 100 processes one or more data flows that traverse the network device 100. In an embodiment, a data flow corresponds to a sequence of packets received by the network device 100 via a certain source port 112 (e.g., from a certain originating device) and destined for transmission via a certain target port 112 (e.g., to a certain target device coupled to the target port), and, in some embodiments, is associated with one or more other parameters, such as a priority level relative to other data flows. Typically, order of data packets in a data flow needs to be maintained through the network device 100 such that the order in which the packets are transmitted from the network device 100 is the same as the order in which the packets were received by the network device 100. However, because processing of packets in a data flow is distributed among multiple ones of the PPEs 104, processing of the packets in a data flow is completed by the PPEs 104 in an order different than the order in which the packets were received by the network device 100, in at least some situations. Out of order completion of processing of the packets is due, for example, to variability in latency encountered by different PPEs 104 when accessing an external resource, such as external memory, an external processing engine, etc. for performing a processing operation on a packet.

In an embodiment, the packet ordering unit 106 is configured to maintain order of at least the packets belonging to a same data flow entering the network device 100 to ensure that these packets are transmitted from the network device 100 in the order in which the packets were received by the network device 100. To efficiently maintain the order of packets, the controller 110 operates on a plurality of queues 114-1 through 114-n corresponding to respective packet classes, and uses the queues 114 to maintain the order of packets within each class. A packet class corresponds to a group of packets that share one or more attributes associated with the packets, in various embodiments. For example, a packet class corresponds to a group of packets that belong to a same data flow, a group of packets that belong to several data flows (e.g., several data flows that share a priority level), packets that share a number of instructions that the PPEs 104 need to execute in order to process the packets, a group of packets that share an expected processing time, or a group of packets that share any other suitable attribute or suitable combinations of attributes associated with the packets. In an embodiment, the classes are predefined in the network device 100. In another embodiment, at least some of the classes are configurable by an operator of the network device 100.

In an embodiment, the controller 110 queues the packets in respective queues 114 corresponding to respective packet classes associated with the packets according to an order in which the packets were received by the network device 100. In another embodiment, the controller 110 assigns packet IDs to the packets, and queues the packet IDs assigned to the packets, rather than the packets themselves, in the queues 114. In an embodiment, the controller 110 assigns the packet IDs from a pool of non-sequential free packet IDs. In this embodiment, packet IDs assigned to packets in a sequence of packets received by the network device 100 do not necessarily represent the order in which the packets were received by the network device 100. The controller 110 then distributes the packets to the PPEs 104 for processing of the packets by the PPEs 104. For ease of explanation and brevity, "enqueuing a packet" in a queue 114 or "dequeuing a packet" from a queue 114 hereafter refers to enqueuing/dequeuing the packet itself in/from the queue 114 or enqueuing/dequeuing a packet ID in/from the queue 114.

In an embodiment, the PPEs 104 generally complete processing of the packets independently of the order in which the packets are queued in the queues 114. In an embodiment, the PPEs 104 are configured to perform at least some processing operations on the packets independently of respective locations of the packets in the respective queues 114. The PPEs 104 communicate with the packet ordering unit 106, for example to instruct the packet ordering unit 106 to take certain actions with respect to the packets queued in the queues 114. For example, the PPEs 104 are configured to issue instructions indicative of actions to be taken by the controller 110, such as updating a class corresponding to a packet, forwarding a packet to a target port 112 for transmission of the packet via the target port 112, releasing a packet so that the packet can be forwarded to a target port 112, dropping the packet, etc., and to send the instructions indicative of the actions to the packet ordering unit 106. In other embodiment, other processing elements of the network device 100 instruct the packet ordering unit 106 to perform an action with respect to a packet, such as to update a class corresponding to a packet. For example, at least some such instructions are sent to the packet ordering unit 106 from a hardware element (e.g., a hardware processing engine or a lookup memory, such as a ternary content addressable memory (TCAM), for example) that is engaged or accessed by a PPE 104 to determine the class of the packet, in an embodiment.

In various embodiments described below, the controller 110 maintains order of packets queued in a same queue 114 by performing actions with respect to a packet queued in the queue 114 when the packet is at the head of the queue 114. As such, a packet at the head of a queues 114 prevents the controller 110 from performing actions with respect to other packets queued in the same queue 114, thereby blocking the other packets queued in the same queue 114. In other words, because actions with respect to packets queued in a queue 114 are performed only when the packets are at the head of the queue 114, in an embodiment, the controller 110 delays performing an action with respect to a packet received by the network device 100 at a relatively later time until an action with respect to a packet received at a relatively earlier time is performed, thereby preserving the order of packets queued in the queue 114.

In an embodiment, the queues 114 are implemented using respective linked lists. In this embodiment, each queue 114 links a group of packets via a sequence of entries each of which contains a reference to a next entry in the queue, in an embodiment. Implementing the queues 114 as respective linked lists allows the controller 110 to efficiently utilize a memory space for storing the plurality of queues 114. In another embodiment, the queues 114 are implemented in other suitable manners, for example as First In First Out (FIFO) queues.

According to an embodiment, a class to which a packet corresponds is determined during processing of the packet by a PPE 104 or by another processing element (e.g., an external hardware engine engaged to determine the packet class by the PPE 104). Accordingly, the class to which a packet corresponds is not yet known when the packet is received by the packet ordering unit 106 and initially enqueued in the packet ordering unit 106. In an embodiment, the controller 110 is configured to initially enqueue the packets in one or more default class queues. For example, in some embodiments, the queues 114 include multiple default queues 114, with each default queue 114 queuing packets that share a certain parameter that is known to the controller 110 prior to processing of the packets by the PPEs 104. For example, in one such embodiment, the queues 114 include respective default queues 114 for each of the source ports 112 serviced by the packet ordering unit 106 (e.g., each of some or all of the source ports 112). In this embodiment, the controller 110 is configured to enqueue a packet in a default queue 114 that corresponds to the source port 112 via which the packet was received by the network device 100. In this embodiment, packets that enter the network device 100 via different ones of the source ports 112 are queued in different default class queues 114, and a packet that entered the network device 100 via a first port 112 (e.g., the ports 112-1) will not unnecessarily block a packet that entered the network device 100 via a second port 112, in an embodiment. In another embodiment, though, the queues 114 include a single default class queue for initially queuing all packets that are enqueued by the controller 110 in the packet ordering unit 106. In this embodiment, the controller 110 initially enqueues a packet in the single default queue 114.

In an embodiment, the PPEs 104 analyze at least some of the packets being processed by the PPEs 104 to determine respective packet classes corresponding to the at least some of the packets based on one or more attributes associated with the packets (e.g., based on one or more parameters in a header of a packet, based on one or more parameters calculated for the packet during processing of the packet by the packet processor 102, a combination thereof, or any other suitable parameter or parameters included in or associated with the packet). The PPEs 104 are configured to selectively provide updates corresponding to at least some of the packets to the packet ordering unit 106 and, more specifically, to the controller 110 of the packet ordering unit 106, indicating to the packet ordering unit 106 that classes particular classes to which the packets correspond. In an embodiment, the PPEs 104 provide class updates with respect to some of the packets (e.g., packets for which processing time is expected to be relatively long), and does not provided updates to the packet ordering unit 106 with respect to other packets (e.g., packets for which processing time is expected to be relatively short).

In an embodiment, the packet ordering unit 106 receives multiple updates for a packet during processing of the packet by the PPEs 104 and/or other processing elements of the network device 100. For example, the packet ordering unit 106 receives an instruction for a packet indicating that the packet should be moved to a temporary class before an actual class to which the packet belongs has been determined by the PPE 104 or other processing element of the network device 100. In response to receiving the instruction indicating that a packet should be moved to a temporary class, the packet ordering unit 106 moves the packet from the queue 114 in which the packet is currently queued to another one of the queues 114, for example to a queue 114 corresponding to a current class of the packet incremented by an integer, such as one (e.g., class 0 incremented by one to class 1). Subsequently, the packet ordering unit 106 receives one or more additional temporary class updates corresponding to the packet until an actual class is determined for the packet. Performing temporary class updates for a packet unblocks other packets in the queue in which the packet is currently queued prior to determining the class to which the packet corresponds, in at least some embodiments.

According to an embodiment, when the packet ordering unit 106 receives a class update for a particular packet, the controller 110 of the packet ordering unit 106 moves the packet from a queue 114 in which the packet is currently queued to a new queue 114 corresponding to a class indicated by the class update for the particular packet. In an embodiment, to properly maintain order of packets, the controller 110 does not move packets to new queues 114, however, until the packets reach heads of queues in which the packets are currently queued. Thus, when the controller 110 receives a class update corresponding to a packet, the controller 110 checks whether the packet is at the head of the queue in which the packet is queued, or, alternatively, checks whether the packet is at the head of any of the queues 114, and performs the class update (e.g., moves the packet to the queue 114 corresponding to the class indicated by the class update) if the packet is currently at the head of a queue 114. If the packet is not currently at the head of a queue 114, the controller 110 suitably associates the update action with the packet and waits, until the packet reaches the head of the queue in which the packet is queued, to actually perform the update.

In some embodiments and/or scenarios, the packet ordering unit 106 receives a second class update for a packet prior to a previously received class update for the packet has been performed by the packet ordering unit 106, such as when the packet has not yet reached the head of the queue in which the packet was queued prior to the previous update was received by the packet ordering unit 106. In such cases, the controller 110 suitably associates an update action corresponding to the second update with the packet, in an embodiment. Accordingly, in this case, both a first update action corresponding to the previously received class update and a second update action corresponding to the second class update are associated with the packet. The controller 110 performs each of the first and the second update actions when the packet reaches the head of the relevant queue 114, in an embodiment. In other words, the controller 110 performs the first update action when the packet reaches the head of the queue 114 in which the packet is currently queued, and performs the second class update when the packet reaches the head of the queue 114 to which the packet is moved according to the first update action, in an embodiment.

In an embodiment, when a PPE 104 completes processing of a packet, the PPE 104 send an instruction to the packet ordering unit 106 indicating to the packet ordering unit 106 that processing of the packet has been completed. When the controller 110 of the packet ordering unit 106 receives an instruction from a PPE 104 indicating that processing of a packet has been completed by the PPE 104, the controller 110 waits until the packet reaches the head of the queue 114 in which the packet is queued, and then causes the packet to be sent to an appropriate target port 112 for transmission of the packet via the port 112. Because the controller 110 performs an action with respect to a packet (i.e., updating a class for a packet, sending a packet to a target port for transmission of the packet, dropping a packet etc.) when the packet is at the head of the queue 114 in which the packet is currently queued in the packet ordering unit 106, the controller 110 ensures that packet order is maintained within the queue 114, as will be explained in more detail below, in various embodiments and/or scenarios.

The controller 110 includes an instruction execution processor 120 (sometimes referred to herein as "the central execution unit 120") that is configured to receive, at an input of the central execution unit 120, indications of processing actions (e.g., instructions) and to perform such processing actions. For example, the central execution unit 120 receives instructions from the PPEs 104, such as instructions to move packets from one class to another class, to release packets to target ports 112, etc. As discussed above, however, such an instruction is typically to be executed only when the corresponding packet is at the head of a queue 114. Thus, when the central execution unit 120 receives an instruction, and the corresponding packet is not at the head of a queue, the central execution unit 120 is configured to store the instruction in a memory, e.g., an actions database 122.

In an embodiment, when the central execution unit 120 removes a packet from a head of one of the queues 114 (e.g., queue 114-1), which results in another packet moving to the head of the queue 114-1, the central execution unit 120 generates a first output that indicates that there is a new head of the queue 114-1.

The controller 110 also includes a first instruction feedback processor 124 (sometimes referred to herein as "the new head examination unit 124"), which is coupled to the central execution unit 120. The new head examination unit 124 is configured to receive the first output from the central execution unit 120. In response to the first output, the new head examination unit 124 determines whether any instructions corresponding to the packet that newly reached the head of one of the queues 114, to which the output corresponds, are stored in the actions database 122. If any instructions corresponding to the packet newly at the head of one of the queues 114 are stored in the actions database 122, the new head examination unit 124 provides those instructions to the input of the central execution unit 120.

In an embodiment, when the central execution unit 120 moves a packet from a first one of the queues 114 to a second one of the queues 114, which was previously empty, this movement results in the packet immediately becoming the head of the second one of the queues 114, and the central execution unit 120 generates a second output that indicates that a transferred packet is at the head of the second one of the queues 114.

The controller 110 also includes a second instruction feedback processor 128 (sometimes referred to herein as "the transferring head examination unit 128"), which is coupled to the central execution unit 120. The transferring head examination unit 128 is configured to receive the second output from the central execution unit 120. In response to the second output, the transferring head examination unit 128 determines whether any instructions corresponding to the transferred packet at the head of the second one of the queues 114 are stored in the actions database 122. If any instructions corresponding to the transferred packet at the head of the second one of the queues 114 are stored in the actions database 122, the transferring head examination unit 128 provides those instructions to the input of the central execution unit 120.

Figure 2:
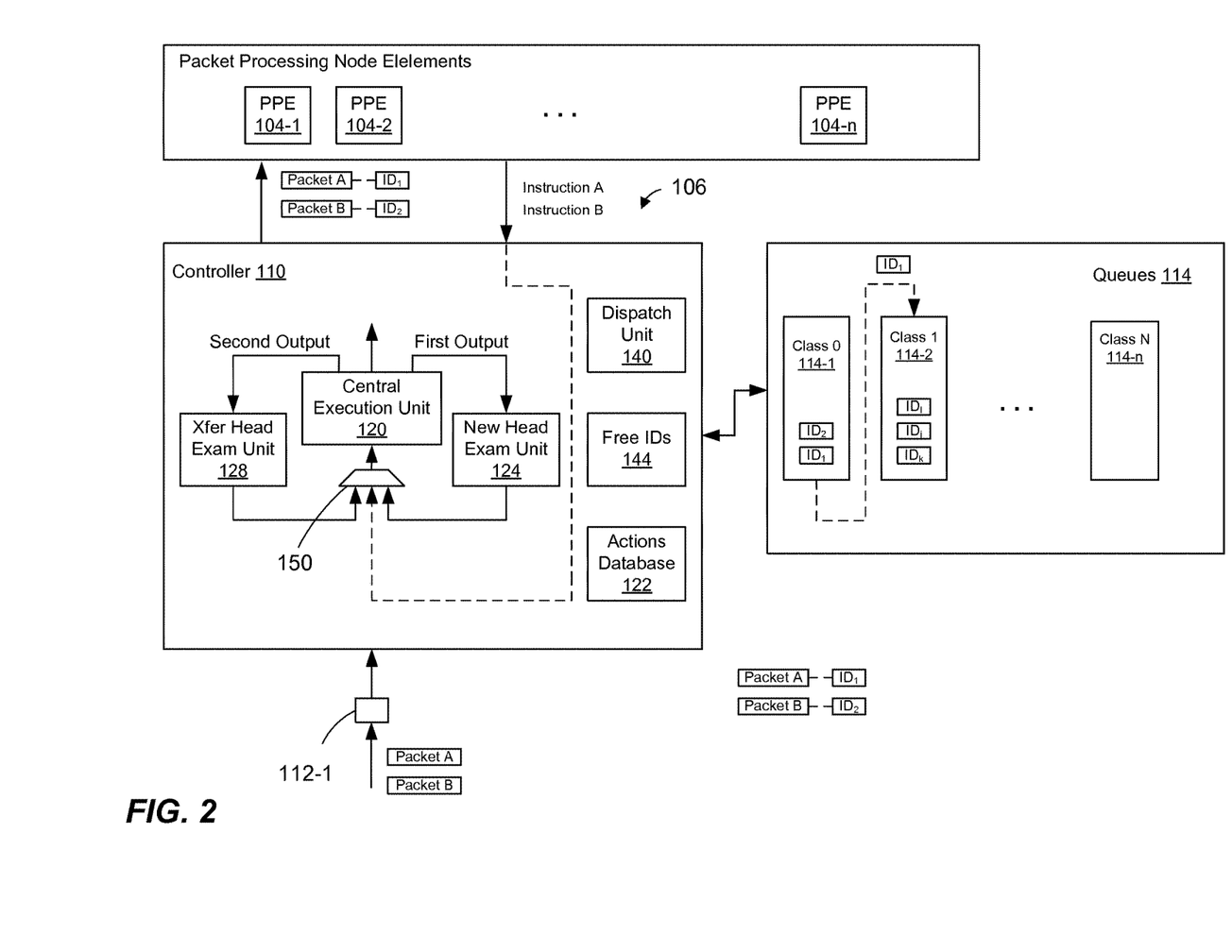
FIG. 2 is a diagram of an example packet ordering processor of the network device of FIG. 1, according to an embodiment.

FIG. 2 illustrates the ordering unit 106 of FIG. 1 in more detail, according to an embodiment. In the embodiment of FIG. 2, the controller 110 includes a dispatch unit 140 configured to assign respective packet IDs to packets, and to send the packets to the PPEs 104 for processing of the packets by the PPEs 104. The controller 110 also includes or is coupled to a free IDs unit 144 (e.g., which includes a memory). The dispatch unit 140 uses a list of free IDs contained in the free IDs unit 144 to assign packet IDs to packets prior to sending the packets to PPEs 104 for processing of the packets by the PPEs 104. In an embodiment, the free IDs unit 144 includes a queue, such as a FIFO or a linked list, of free IDs. In an embodiment, the dispatch unit 140 suitably associates each packet and the packet ID assigned to the packet, and sends the packet along with the packet ID to a PPE 104. The PPE 104 uses the packet ID associated with the packet to communicate with the central execution unit 120, for example to send instructions, to the central execution unit 120, indicative of actions to be taken with respect to the packets by the central execution unit 120. Instructions from the PPEs 104 are received at an input 150 of the central execution unit 120.

In an embodiment, the controller 110 is configured to enqueue the packet IDs assigned to the packets in the queues 114 according to an order in which the packets were received by the network device 100. In the embodiment illustrated in FIG. 2, the network device 100 receives a packet A and a packet B via the port 112-1. As illustrated in FIG. 2, the packet A enters the network device 100 at an earlier time relative to the time at which the packet B enters the network device 100. The ordering unit 106 receives the packet A, assigns a packet ID1 to the packet A, and sends the packet along with the packet ID1 assigned to the packet A to a first PPE 104 (e.g., the PPE 104-1) for processing of the packet. Also, the ordering unit 106 enqueues the packet ID1 assigned to the packet A in a default queue 114-1 corresponding to the source port 112-1 via which the packet A was received by the network device 100. Similarly, the ordering unit 106 receives the packet B, assigns a packet ID2 to the packet B, and sends the packet B along the packet ID2 assigned to the packet B to a second PPE 104 (e.g., the PPE 104-2) for processing of the packet B by the second PPE 104. Because the packet A and the packet B are both received by the network device 100 via the port 112-1 and, therefore, the packet A and the packet B are associated with the same port 112-1, the packet A and the packet B are queued in the same default queue 114-1, in an embodiment. Further, because packet A entered the network device 100 before packet B entered the network device 100, packet A is queued in the queue 114-1 ahead of the packet B, in an embodiment.

Subsequently, the central execution unit 120 receives, from the PPE 104-1, an instruction A indicative of an action to be taken with respect to the packet A, and receives from the PPE 104-2, an instruction B indicative of an action to be taken with respect to the packet B. As illustrated in FIG. 2, the central execution unit 120 receives the instruction B before receiving the instruction A, in the illustrated embodiment and scenario. Instruction A and instruction B are received at the input 150 of the central execution unit 120.

Upon receiving instruction B, the central execution unit 120 checks whether the ID2 associated with the packet B is at the head of the queue 114-1. Because the ID2 is not at the head of the queue 114-1, the central execution unit 120 does not take the action indicated by the instruction B. Rather, the central execution unit 120 associates the action indicated by instruction B with the packet B, for example by storing an association between the action indicated by the instruction B and the ID2 associated with the packet B in the actions database 122.

Upon receiving instruction A indicating the action to be taken with respect to the packet A, the central execution unit 120 checks whether the ID1 associated with the packet A is at the head of the queue 114-1. Because the ID1 is at the head of the queue 114-1, the central execution unit 120 performs the action indicated by the instruction A. In the embodiment of FIG. 2, the instruction A indicates an update to the packet class for the packet A. In particular, the instruction A indicates that the packet A belongs to the packet class 1, in an example embodiment. Alternatively, in another embodiment, the instruction A is issued by the PPE 104-1 prior to a class having been assigned to the packet A by the PPE 104-1. In this case, the instruction A indicates that the packet A should be moved to a new class without indicating the specific new class. In this case, the central execution unit 120 determines a new packet class for the packet A in any suitable manner, for example by incrementing the current class corresponding to the packet A (e.g., incrementing class 0 to class 1), and moves the packet ID1 to the determined new class for the packet A by removing the ID1 from the head of the queue 114-1 corresponding to the packet class 0 and adding the packet ID1 to the tail of the queue 114-2 corresponding to the packet class 1.

As another example, when the instruction A indicates that processing of the packet A is completed and the packet A is ready to be forwarded to a target port 112 for transmission of the packet A via the target port 112, the central execution unit 120 causes the packet A to be sent for transmission to the target port 112, removes the packet ID1 from the queue 114-1, and releases the packet ID1 for example by returning the packet ID1 to the pool of free IDs 144, in an embodiment. As yet another example, the instruction A indicates that the packet A should be dropped, the controller 110 removes the ID1 from the queue 114-1 and returns the ID1 to the pool of free IDs 144, in an embodiment.

After the action is performed with respect to the packet A, the packet ID2 corresponding to the packet B moves to the head of the queue 114-1 and the central execution unit 120 generates the first output indicating that there is a new head of the queue 114-1. In an embodiment, the central execution unit 120 generates the first output to include the ID2 of the new head of the queue 114-1, i.e., packet B. In response to the first output, the new head examination unit 124 checks whether an instruction indicating an action to be taken with respect to packet B is stored in the actions database 122. For example, the new head examination unit 124 queries the actions database 122 for an action associated with the ID2 corresponding to the packet B. If an instruction associated with the ID2 is found in the actions database 122, then the new head examination unit 124 forwards the instruction to the input 150 of the central execution unit 120. In the scenario of FIG. 2, the new head examination unit 124 determines that instruction B in the actions database 122 corresponds to the new head of the queue 114-1 (e.g., packet B). Thus, the new head examination unit 124 forwards instruction B to the input 150 of the central execution unit 120. Because the instruction forwarded by the new head examination unit 124 corresponds to a packet at the head of a queue (e.g., packet B at the head of the queue 114-1), the central execution unit 120 performs the action corresponding to instruction B and with respect to packet B.

Figure 3:
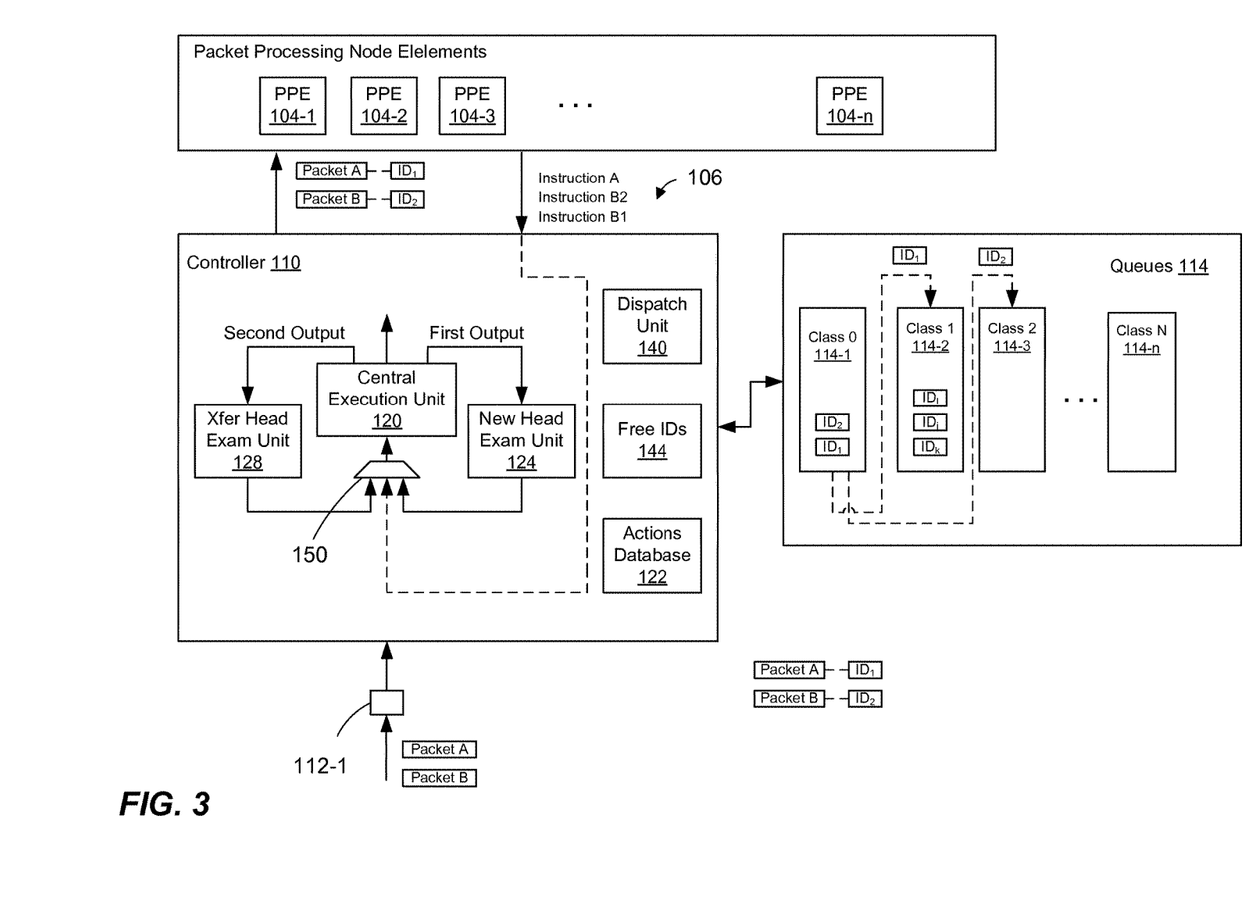
FIG. 3 is a diagram of the example packet ordering processor of FIG. 2 in a different scenario, according to an embodiment.

FIG. 3 illustrates the ordering unit 106 of FIGS. 1 and 2 according to another scenario. In particular, the central execution unit 120 receives an instruction B1 from the PPE 104-2, and receives an instruction B2 from PPE 104-3. Both instructions B1 and B2 are indicative of actions to be taken with respect to the packet B. Subsequently, the central execution unit 120 receives, from the PPE 104-1, the instruction A. Instructions A, B1, and B2 are received at the input 150 of the central execution unit 120.

Upon receiving instruction B1, the central execution unit 120 checks whether the ID2 associated with the packet B is at the head of the queue 114-1. Because the ID2 is not at the head of the queue 114-1, the central execution unit 120 does not take the action indicated by the instruction B1. Rather, the central execution unit 120 associates the action indicated by instruction B1 with the packet B, for example by storing an association between the action indicated by the instruction B1 and the ID2 associated with the packet B in the actions database 122. Similarly, upon receiving instruction B2, the central execution unit 120 checks whether the ID2 associated with the packet B is at the head of the queue 114-1. Because the ID2 is not at the head of the queue 114-1, the central execution unit 120 does not take the action indicated by the instruction B2. Rather, the central execution unit 120 associates the action indicated by instruction B2 with the packet B, for example by storing an association between the action indicated by the instruction B2 and the packet ID2 associated with the packet B in the actions database 122.

Upon receiving instruction A indicating the action to be taken with respect to the packet A, the central execution unit 120 checks whether the ID1 associated with the packet A is at the head of the queue 114-1. Because the ID1 is at the head of the queue 114-1, the central execution unit 120 performs the action indicated by the instruction A. In the example scenario of FIG. 3, the central execution unit 120, responsive to instruction A, moves the packet ID1 to a determined new class by removing the ID1 from the head of the queue 114-1 corresponding to the packet class 0 and adding the packet ID1 to the tail of the queue 114-2 corresponding to the packet class 1.

After the action is performed with respect to instruction A, the packet ID2 corresponding to the packet B moves to the head of the queue 114-1 and the central execution unit 120 generates the first output indicating that there is a new head of the queue 114-1. In an embodiment, the central execution unit 120 generates the first output to include the ID2 of the new head of the queue 114-1, i.e., packet B. In response to the first output, the new head examination unit 124 checks whether an instruction indicating an action to be taken with respect to packet B is stored in the actions database 122. In the scenario of FIG. 2, the new head examination unit 124 determines that instruction B1 in the actions database 122 corresponds to the new head of the queue 114-1 (e.g., packet B). Thus, the new head examination unit 124 forwards instruction B1 to the input 150 of the central execution unit 120. Because the instruction forwarded by the new head examination unit 124 corresponds to a packet at the head of a queue (e.g., packet B at the head of the queue 114-1), the central execution unit 120 performs the action corresponding to instruction B1 and with respect to packet B.

In the example scenario of FIG. 3, the central execution unit 120, responsive to instruction B1, moves the packet ID2 to a determined new class by removing the ID2 from the head of the queue 114-1 corresponding to the packet class 0 and adding the packet ID2 to the tail of the queue 114-3 corresponding to the packet class 2. In the example scenario of FIG. 3, the queue 114-3 was previously empty. Thus, the transfer of the packet ID2 resulted in the packet ID2 immediately being at the head of the queue 114-3 corresponding to the packet class 2. Thus, the central execution unit 120 generates the second output indicating that the transfer of packet B resulted in packet B being at the head of the queue 114-3. In an embodiment, the central execution unit 120 generates the second output to include the ID2 of the new head of the queue 114-3, i.e., packet B.

In response to the second output, the transferring head examination unit 128 checks whether an instruction indicating an action to be taken with respect to packet B is stored in the actions database 122. In the scenario of FIG. 3, the transferring head examination unit 128 determines that instruction B2 in the actions database 122 corresponds to the new head of the queue 114-3 (e.g., packet B). Thus, the transferring head examination unit 128 forwards instruction B2 to the input 150 of the central execution unit 120. Because the instruction forwarded by the transferring head examination unit 128 corresponds to a packet at the head of a queue (e.g., packet B at the head of the queue 114-3), the central execution unit 120 performs the action corresponding to instruction B2 and with respect to packet B.

Referring now to FIGS. 1-3, in some embodiments, the controller device 110 is implemented on one or more integrated circuit devices. For example, in some embodiments, the central execution unit 120, the new head examination unit 124, and the transferring head examination unit 128 are implemented on an integrated circuit device. In an embodiment, the central execution unit 120, the new head examination unit 124, and the transferring head examination unit 128 are implemented in hardware using a pipeline architecture. For example, in an embodiment, the central execution unit 120, the new head examination unit 124, and the transferring head examination unit 128 are each implemented as respective pipelines. In an embodiment, a last stage of the central execution unit 120 pipeline is coupled to i) a first stage of the new head examination unit 124 pipeline, and ii) a first stage of the transferring head examination unit 128 pipeline. In an embodiment, a last stage of the new head examination unit 124 pipeline is coupled to a first stage of the central execution unit 120 pipeline, and a last stage of the transferring head examination unit 128 pipeline is coupled to the first stage of the central execution unit 120 pipeline. For instance, in an embodiment, the last stage of the central execution unit 120 pipeline generates the first output and the second output discussed above, and thus the last stage of the central execution unit 120 pipeline feeds i) the first stage of the new head examination unit 124 pipeline, and ii) the first stage of the transferring head examination unit 128 pipeline. Similarly, the last stage of the new head examination unit 124 pipeline and the last stage of the transferring head examination unit 128 pipeline both feed the first stage of the central execution unit pipeline 120.

In other embodiments, one or more of the central execution unit 120, the new head examination unit 124, and the transferring head examination unit 128 are implemented utilizing a suitable hardware architecture other than a pipeline architecture.

Figure 4:
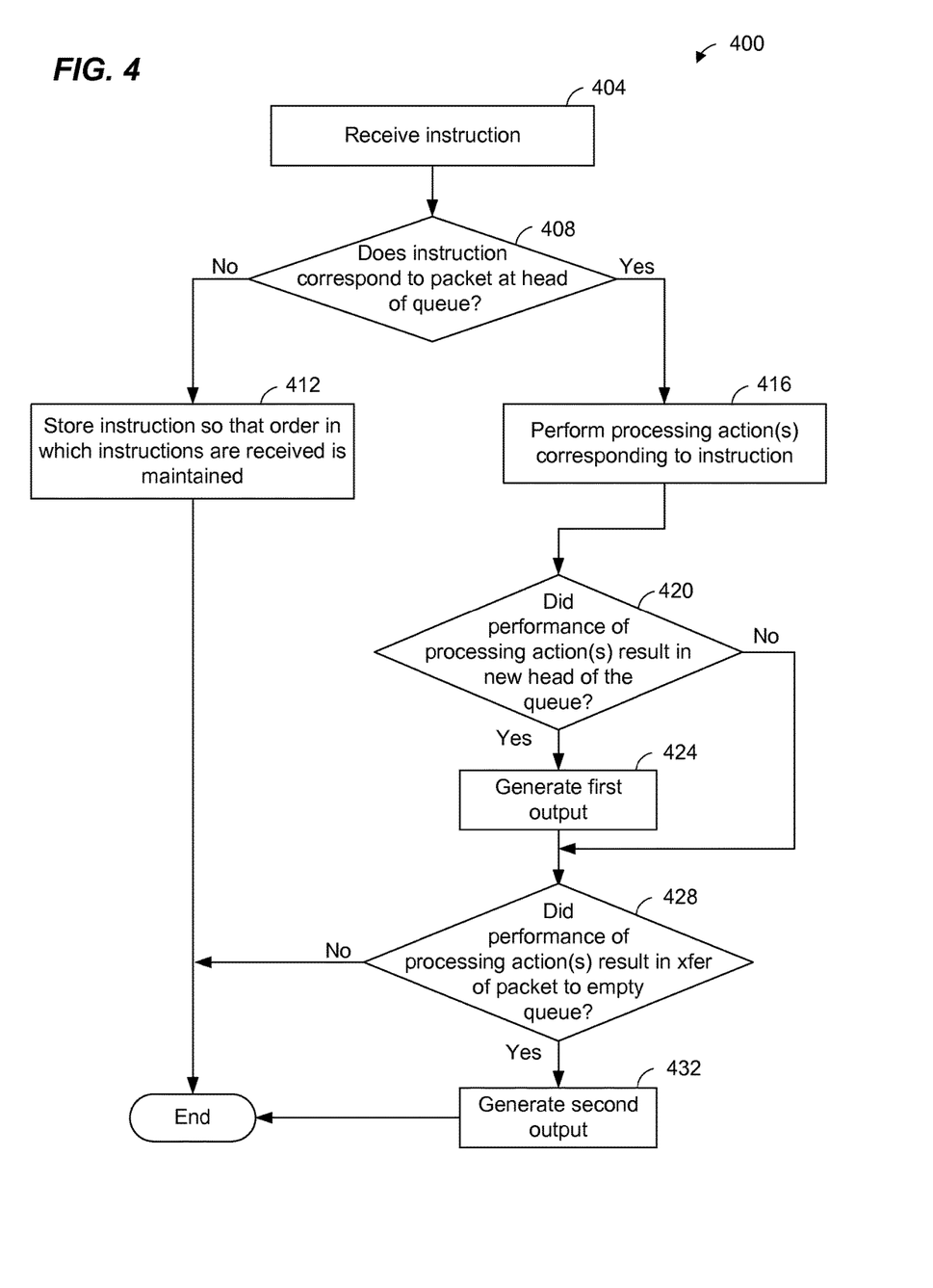
FIG. 4 is a flow diagram of an example method of operation of a central execution processor of the packet ordering processor of FIGS. 1-3, according to an embodiment.

FIG. 4 is a flow diagram of an example method 400 corresponding to operation of the central execution unit 120, according to an embodiment. Thus, in an embodiment, the method 400 is implemented by the central execution unit 120. In other embodiments, however, the method 400 is implemented by another suitable device. Merely for explanatory purposes, the method 400 is discussed with reference to FIGS. 1-3. In some embodiments, however, the method 400 is implemented in a suitable network device different than the network device 100 of FIG. 1 and/or in a suitable packet ordering unit different than the packet ordering unit 106.

At block 404, an instruction is received, where the instruction is indicative of one or more processing actions to be performed. As an illustrative example, the instruction is indicative of transferring a packet ID from a first queue to a second queue, according to an embodiment. In an embodiment, the first queue and the second queue correspond to different classes as discussed above. As another illustrative example, the instruction is indicative of removing a packet ID from a queue, according to an embodiment. In an embodiment, the instruction indicative of removing the packet ID from the queue corresponds to an instruction for releasing a packet, e.g., for forwarding of the packet to an egress port for transmission from a network device. In another embodiment, the instruction indicative of removing the packet ID from the queue corresponds to an instruction for dropping the packet. FIGS. 2 and 3 illustrate instructions being received at the input 150 of the central execution unit 120.

In an embodiment, the instruction received at block 404 includes or is associated with a packet ID corresponding to a packet on which the one or more processing actions are to be performed.

At block 408, the central execution unit 120 determines whether the instruction received at block 404 corresponds to a packet at the head of any of the queues 114. For instance, in an embodiment, the instruction includes or is associated with a packet ID, and the central execution unit 120 determines whether the packet ID is at the head of any of the queues 114.

If it is determined at block 408 that the instruction received at block 404 does not corresponds to a packet at the head of any of the queues 114, the flow proceeds to block 412. At block 412, the instruction received at block 404 is stored in a memory. For example, the instruction received at block 404 is stored in the actions database 122, in an embodiment. The instruction is stored in the memory at block 412 in a manner such that the order in which the instruction was received, with respect to any other previously received instructions corresponding to the packet ID, is maintained. For example, if the actions database 122 stores two other instructions, e.g., instruction_1 and instruction_2, that correspond to the packet ID, where instruction_1 was received prior to instruction_2, and both instruction_1 and instruction_2 were received prior to the instruction (instruction_3) received at block 404, then the instruction_3 is stored in the actions database 122 so that the order in which the instructions were received (e.g., instruction_1, instruction_2, instruction_3) is maintained. In an embodiment, multiple instructions corresponding to a packet ID are stored in the actions database 122 are stored as a linked list that maintains the order in which the instructions are received by the central execution unit 120.

On the other hand, if it is determined at block 408 that the instruction received at block 404 does correspond to a packet at the head of a queue 114, the flow proceeds to block 416. At block 416, one or more actions corresponding to the instruction received at block 404 are performed. As discussed above an action performed at block 416 may include actions such as releasing the packet ID corresponding to the packet from the queues 114, transferring the packet ID to another queue 114, etc. Releasing the packet ID from the queues 114 may correspond to dropping the packet, forwarding the packet to an egress port 112 for transmission from the network device 100, etc.

At block 420, the central execution unit 120 determines whether performance of the action(s) at block 416 resulted in a new head of the queue 114 in which the packet ID was stored. For example, if the block 416 involved releasing the packet ID from the queues 114 or transferring packet ID to another queue 114, such an action may result in another packet ID becoming the new head of the queue 114.

If the central execution unit 120 determines at block 420 that there is a new head of the queue 114, the flow proceeds to block 424. At block 424, the central execution unit 120 generates the first output discussed above, where the first output indicates that there is a new head at one of the queues 114. In an embodiment, the first output includes a packet ID corresponding to the new head. In an embodiment, the first output also includes an indicator of the queue 114 that has the new head. After block 420, the flow proceeds to block 428.

Referring back to block 420, if the central execution unit 120 determines at block 420 that there is not a new head of the queue 114, the flow proceeds to block 428.

At block 428, the central execution unit 120 determines whether performance of the action(s) at block 416 resulted in the packet ID being transferred to a previously empty queue 114 resulting in the packet ID immediately becoming the head of the queue 114 to which the packet ID was transferred.

If the central execution unit 120 determines at block 428 that transfer of the packet ID resulted in the packet ID immediately becoming the head of the queue 114 to which the packet ID was transferred, the flow proceeds to block 432. At block 432, the central execution unit 120 generates the second output discussed above, where the second output indicates that the transferred packet ID immediately became the head of the queue 114 to which the packet ID was transferred. In an embodiment, the second output includes the packet ID. In an embodiment, the second output also includes an indicator of the queue 114 to which the packet ID was transferred.

Figure 5:
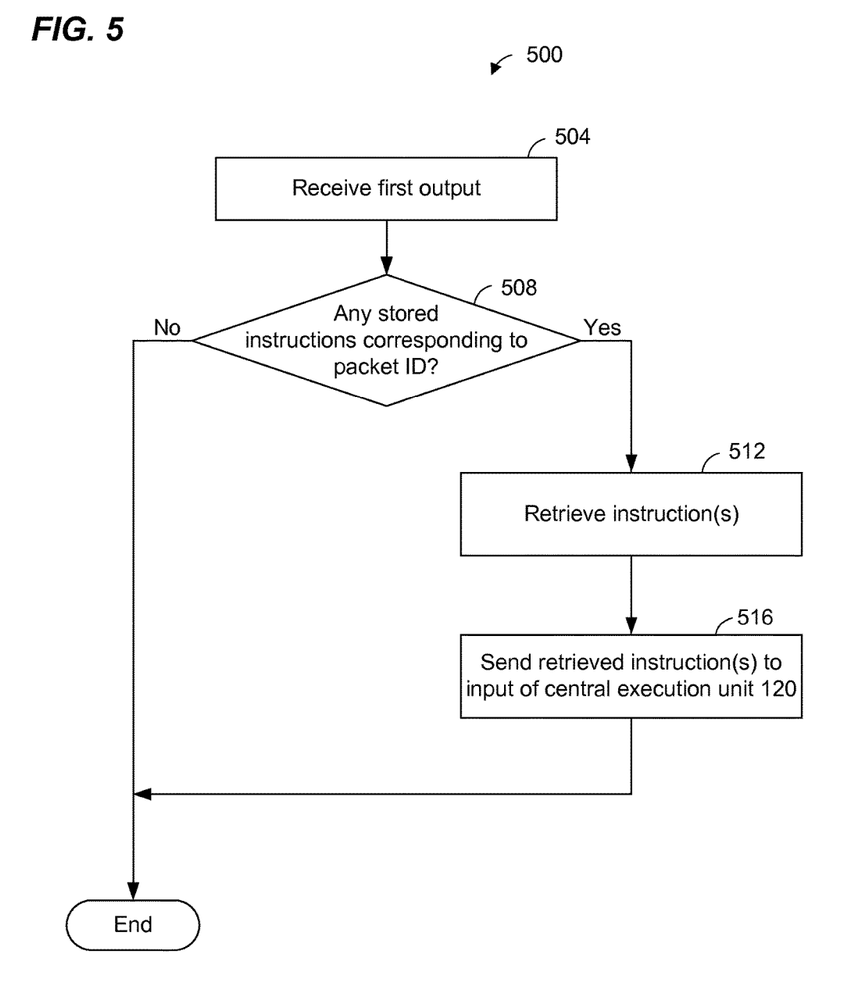
FIG. 5 is a flow diagram of an example method of operation of a new head examination processor of the packet ordering processor of FIGS. 1-3, according to an embodiment.

FIG. 5 is a flow diagram of an example method 500 corresponding to operation of the new head examination unit 124, according to an embodiment. Thus, in an embodiment, the method 500 is implemented by the new head examination unit 124. In other embodiments, however, the method 500 is implemented by another suitable device. Merely for explanatory purposes, the method 500 is discussed with reference to FIGS. 1-3. In some embodiments, however, the method 500 is implemented in a suitable network device different than the network device 100 of FIG. 1 and/or in a suitable packet ordering unit different than the packet ordering unit 106.

At block 504, the new head examination unit 124 receives the first output discussed above from the central execution unit 120. As discussed above, the first output indicates that there is a new head at one of the queues 114, in an embodiment. In an embodiment, the first output includes a packet ID corresponding to the new head. In an embodiment, the first output also includes an indicator of which one of the queues 114 has the new head.

At block 508, it is determined whether there are any instructions stored in the actions database 122 that correspond to the packet ID associated with the first output received at block 504. For example, in an embodiment, the new head examination unit 124 uses the packet ID included in or otherwise associated with the first output received at block 504 to determine if any instructions corresponding to the packet ID are stored in the actions database 122. If it is determined at block 508 that there are no instructions corresponding to the packet ID in the actions database 122, the flow ends.

On the other hand, if it is determined at block 508 that there are one or more instructions corresponding to the packet ID in the actions database 122, the flow proceeds to block 512. At block 512, the one or more instructions corresponding to the packet ID are retrieved from the actions database 122. At block 516, the one or more instructions retrieved from the actions database 122 at block 512 are provided to the input 150 of the central execution unit 120. In an embodiment in which multiple instructions are stored in the actions database 122 in an order, blocks 512 and 516 are performed such that the instructions are provided to the input of the central execution unit 120 in the order.

Figure 6:
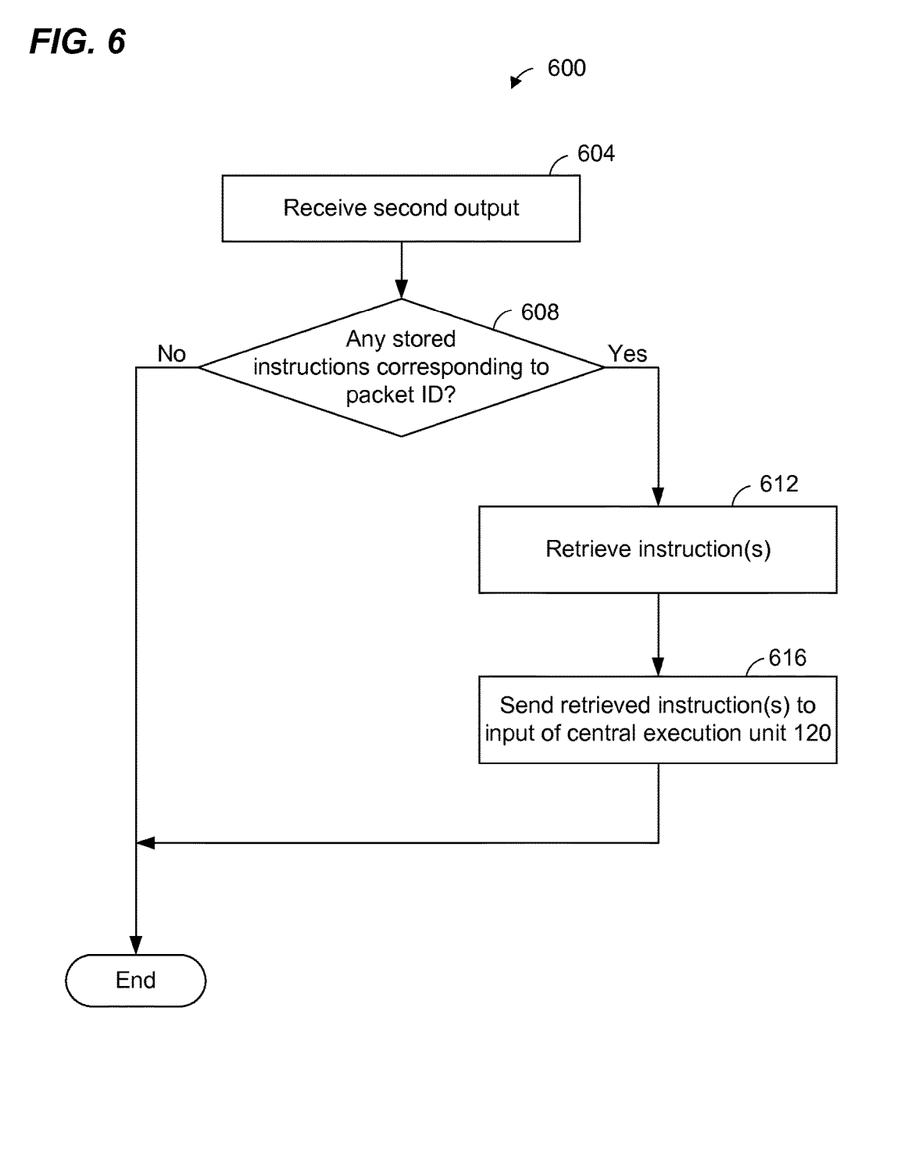
FIG. 6 is a flow diagram of an example method of operation of a transferring head examination processor of the packet ordering processor of FIGS. 1-3, according to an embodiment.

FIG. 6 is a flow diagram of an example method 600 corresponding to operation of the transferring head examination unit 128, according to an embodiment. Thus, in an embodiment, the method 600 is implemented by the transferring head examination unit 128. In other embodiments, however, the method 600 is implemented by another suitable device. Merely for explanatory purposes, the method 600 is discussed with reference to FIGS. 1-3. In some embodiments, however, the method 600 is implemented in a suitable network device different than the network device 100 of FIG. 1 and/or in a suitable packet ordering unit different than the packet ordering unit 106.

At block 604, the transferring head examination unit 128 receives the second output discussed above from the central execution unit 120. As discussed above, the second output indicates that a transferred packet ID resulted in the transferred packet ID immediately becoming the head of one of the queues 114, in an embodiment. In an embodiment, the second output includes a packet ID corresponding to the new head. In an embodiment, the second output also includes an indicator of which one of the queues 114 that has the new head.

At block 608, it is determined whether there are any instructions stored in the actions database 122 that correspond to the packet ID associated with the second output received at block 604. For example, in an embodiment, the transferring head examination unit 128 uses the packet ID included in or otherwise associated with the second output received at block 604 to determine if any instructions corresponding to the packet ID are stored in the actions database 122. If it is determined at block 608 that there are no instructions corresponding to the packet ID in the actions database 122, the flow ends.

On the other hand, if it is determined at block 608 that there are one or more instructions corresponding to the packet ID in the actions database 122, the flow proceeds to block 612. At block 612, the one or more instructions corresponding to the packet ID are retrieved from the actions database 122. At block 616, the one or more instructions retrieved from the actions database 122 at block 612 are provided to the input 150 of the central execution unit 120. In an embodiment in which multiple instructions are stored in the actions database 122 in an order, blocks 612 and 616 are performed such that the instructions are provided to the input of the central execution unit 120 in the order.

In some embodiments, the transferring head examination unit 128 is omitted. In such embodiments, the central execution unit 120 need not be configured to generate the second output that indicates that a transferred packet ID resulted in the transferred packet ID immediately becoming the head of one of the queues 114.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an application-specific integrated circuit (ASIC), a programmable logic device, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A controller device, comprising:
an instruction execution processor having an input to receive instructions associated with maintaining a queue for storing packet identifiers (IDs) corresponding to packets being processed by a network device, the instruction execution processor comprising a first hardware pipeline having a first stage and a last stage;
a memory coupled to the instruction execution processor, the memory for storing instructions received at the input of the instruction execution processor and not executed by the instruction execution processor; and
an instruction feedback processor including a second hardware pipeline having a first stage and a last stage, wherein the first stage of the second hardware pipeline is coupled to the last stage of the first hardware pipeline so that the last stage of the first hardware pipeline feeds the first stage of the second hardware pipeline, and wherein the last stage of the second hardware pipeline is coupled to the first stage of the first hardware pipeline so that the last stage of the second hardware pipeline feeds the first stage of the first hardware pipeline, the instruction feedback processor configured to, in response to receiving an output from the instruction execution processor,
identify one or more instructions, stored in the memory, that correspond to a new packet ID at the head of the queue, and
feed back, to the input of the instruction execution processor, the one or more identified instructions.

2. The controller device of claim 1, wherein:
the queue is a first queue associated with a first group of packets;
the instruction execution processor is configured to:
execute instructions associated with maintaining a plurality of queues, including the first queue, for storing packet IDs corresponding to packets being processed by the network device,
execute a received instruction when the received instruction corresponds to any packet ID at a head of any queue among the plurality of queues,
store, in the memory, the received instruction when the received instruction does not correspond to any packet IDs at the heads of the queues, and
generate the output when the new packet ID becomes the head of any one of the queues because the instruction execution processor removed the packet ID previously at the head of the one queue; and
the instruction feedback processor is configured to, in response to receiving the output indicating the new queue head,
identify one or more instructions, stored in the memory, that correspond to the new packet ID at the head of the one queue, and
feed back, to the input of the instruction execution processor, the one or more identified instructions that correspond to the new packet ID at the head of the one queue.

3. The controller device of claim 2, wherein:
the plurality of queues includes a second queue associated with a second group of packets;
the output generated by the instruction execution processor is a first output;
the instruction feedback processor is a first instruction feedback processor;
the instruction execution processor is configured to generate a second output indicating i) a transferred packet ID was transferred from another queue to the second queue when the second queue was empty; and
the controller device further comprises:
a second instruction feedback processor coupled to the instruction execution processor, the second instruction feedback processor configured to, in response to receiving the second output,
identify one or more instructions, stored in the memory, that correspond to the transferred packet ID at the head of the second queue, and
feed back, to the input of the instruction execution processor, the one or more identified instructions corresponding to the transferred packet ID at the head of the second queue.

4. The controller device of claim 2, wherein:
the instruction execution processor is configured to execute i) first instructions that correspond to releasing packet IDs from queues, and ii) second instructions that correspond to transferring packet IDs from heads of first queues to tails of second queues.

5. The controller device of claim 1, further comprising a plurality of packet processing node elements configured to process packets received via network ports;
wherein the plurality of packet processing node elements are coupled to the input of the instruction execution processor; and
wherein the plurality of packet processing node elements are configured to provide instructions to the input of the instruction execution processor.

6. The controller device of claim 5, wherein:
the instruction execution processor is configured to execute instructions associated with maintaining a plurality of queues for storing packet IDs corresponding to packets being processed by the plurality of packet processing node elements, each queue corresponding to a respective ordering of the packets; and the packet processing node elements are configured to perform at least some processing operations independently of respective locations of packet IDs in the queues.

7. The controller device of claim 5, wherein:

the instruction execution processor is configured to execute instructions associated with maintaining a plurality of queues for storing packet IDs corresponding to packets being processed by the plurality of packet processing node elements, each queue corresponding to a respective ordering of the packets; and the queues correspond to classes of packets.

8. The controller device of claim 1, further comprising:

a dispatch processor configured to assign the packet IDs to the packets being processed by the network device.

9. The controller device of claim 8, wherein the dispatch processor is configured to assign the packet IDs from a pool of free packet IDs.

10. A method, comprising:

receiving, at an input of an instruction execution processor comprising a first hardware pipeline having a first stage and a last stage, instructions to be performed by the instruction execution processor, the instructions associated with maintaining a plurality of queues of packet identifiers (IDs) corresponding to packets being processed by a network device;

storing, in a memory, instructions received at the input of the instruction execution processor that are not executed by the instruction execution processor;

generating, with the last stage of the first hardware pipeline of the instruction execution processor, an output that indicates a new head of one of the queues and feeding a first stage of a second hardware pipeline of an instruction feedback processor with the output; and in response to the output, identifying, at the instruction feedback processor, one or more instructions, stored in the memory, that correspond to a new packet ID at the head of the queue, and feeding back, with the instruction feedback processor, the one or more identified instructions to the input of the instruction execution processor including sending the one or more identified instructions with a last stage of the second hardware pipeline to the first stage of the first hardware pipeline.

11. The method of claim 10, wherein:

the plurality of queues include a first queue and a second queue;

the output of the instruction execution processor is a first output;

the instruction feedback processor is a first instruction feedback processor;

the method further comprises:

when a packet ID at a head of the first queue is transferred to the second queue when the second queue was empty, generate a second output of the instruction execution processor; and in response to the second output, identify, at a second instruction feedback processor, one or more instructions, stored in the memory, that correspond to a new transferred packet ID at the head of the second queue, and feeding back, with the second instruction feedback processor, the one or more instructions that correspond to the new transferred packet ID at the head of the second queue to the input of the instruction execution processor.

12. The method of claim 11, wherein:

the second instruction feedback processor comprises a third hardware pipeline having a first stage and a last stage;

generating, with the instruction execution processor, the second output comprises generating the second output with the last stage of the first hardware pipeline and feeding the first stage of the third hardware pipeline with the second output; and feeding back, with the second instruction feedback processor, the one or more identified instructions to the input of the instruction execution processor comprise sending the one or more identified instructions with the last stage of the third hardware pipeline to the first stage of the first hardware pipeline.

13. The method of claim 10, wherein:

receiving instructions at the input of the instruction execution processor comprises i) receiving first instructions that correspond to releasing packet IDs from queues, and ii) receiving second instructions that correspond to transferring packet IDs from heads of first queues to tails of second queues.

14. The method of claim 10, further comprising:

processing, with a plurality of packet processing node elements, packets received via network ports of the network device; and providing instructions generated by the plurality of packet processing node elements to the input of the instruction execution processor.

15. The method of claim 14, wherein:

processing, with the plurality of packet processing node elements, packets received via network ports of the network device includes performing at least some processing operations independently of respective locations of packet IDs in the queues.

16. The method of claim 14, further comprising:

maintaining, with a packet ordering processor, the plurality of queues for storing the packet IDs, the queues corresponding to classes of packets.

17. The method of claim 10, further comprising:

assigning, with a packet ordering processor, the packet IDs to the packets being processed by the network device.

18. The method of claim 17, further comprising:

assigning, with the packet ordering processor, the packet IDs from a pool of free packet IDs.

* * * * *